United States Patent
Hoefelmayr

[11] Patent Number: 5,313,833
[45] Date of Patent: May 24, 1994

[54] MILK FLOW METER

[75] Inventor: Tilman Hoefelmayr, Niederteufen, Fed. Rep. of Germany

[73] Assignee: Bio-Melktechnik Hoefelmayr & Co., Niederteufen, Switzerland

[21] Appl. No.: 890,012

[22] Filed: May 27, 1992

[30] Foreign Application Priority Data

May 28, 1991 [DE] Fed. Rep. of Germany ....... 4117475

[51] Int. Cl.⁵ .............................................. G01F 1/20
[52] U.S. Cl. ................................ 73/215; 134/166 R; 119/14.17
[58] Field of Search .............. 73/215, 202; 134/166 C, 134/166 R; 119/14.17

[56] References Cited

U.S. PATENT DOCUMENTS

| 4,185,586 | 1/1980 | Flocchini | 119/14.08 |
| 4,452,176 | 6/1984 | Hoefelmayr et al. | 73/215 |
| 4,608,864 | 9/1986 | Savoyet | 73/202 |

FOREIGN PATENT DOCUMENTS

| 057267 | 8/1982 | European Pat. Off. |
| 1757520 | 4/1971 | Fed. Rep. of Germany |
| 2608585 | 8/1977 | Fed. Rep. of Germany |
| 2720987 | 12/1977 | Fed. Rep. of Germany |
| 3208197 | 10/1983 | Fed. Rep. of Germany |
| 3345744 | 6/1985 | Fed. Rep. of Germany |
| 3803572 | 8/1989 | Fed. Rep. of Germany |

Primary Examiner—Richard E. Chilcot, Jr.
Assistant Examiner—Harshad Patel
Attorney, Agent, or Firm—Flynn, Thiel, Boutell & Tanis

[57] ABSTRACT

A milk flow meter having a measuring chamber which is connected to a milk supply conduit, the measuring chamber communicating with a discharge chamber and a milk sump at the lower end thereof. A calibrated milk discharge opening is provided between the measuring chamber and the discharge chamber and a milk suction conduit is connected to said milk sump. An additional rinsing conduit is provided, the upper end of the rinsing conduit leading into the discharge chamber and/or the measuring chamber essentially on the level of the upper end of the measuring chamber and the other end of the rinsing conduit being adapted to be connected, with the aid of an adjustment means movable between a measuring position and a rinsing position, essentially exclusively to the milk suction conduit in the rinsing position. In this respect, small passage conduits are preferably provided which connect the suction conduit with the sump and the discharge chamber in the rinsing position of the adjustment means so that the milk flowmeter can be completely emptied of rinsing liquid at the end of a rinsing procedure.

17 Claims, 5 Drawing Sheets

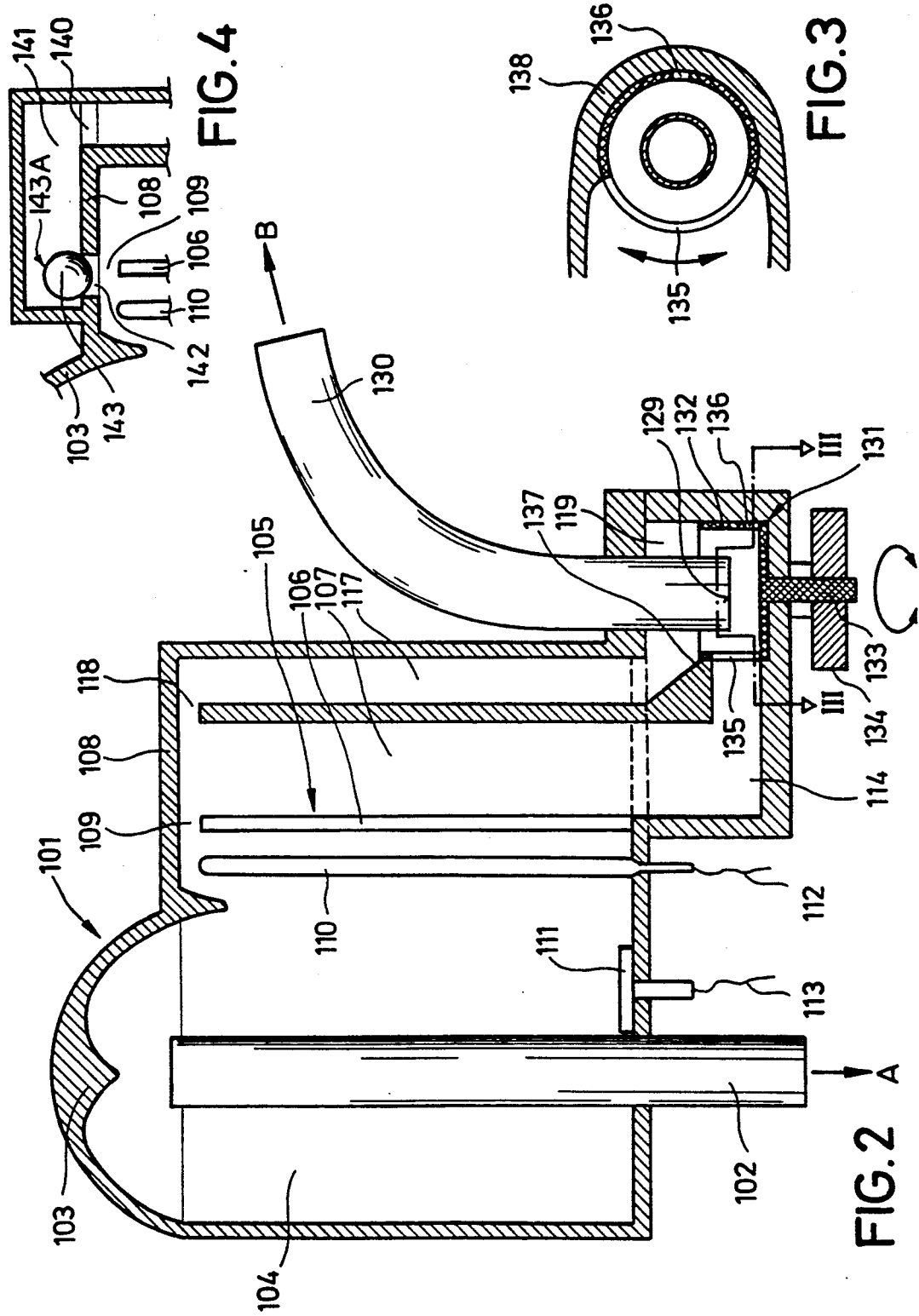

MILK FLOW METER

FIELD OF THE INVENTION

The present invention refers to a milk flow meter comprising a measuring chamber connected to a milk supply conduit and communicating with a discharge chamber, which defines a milk sump at the lower end thereof, via one or several calibrated milk discharge openings and, if desired, via an additional air bypass, and further comprising a milk suction conduit connected to the milk sump.

The present invention especially refers to a milk flow meter of the type described hereinbefore, which is provided with special means for cleaning.

BACKGROUND OF THE INVENTION

In modern milking technology, the flow of milk coming from the cow is milked intermittently, and it has added thereto transport air (approx. 8 liters free air per minute) as well as, frequently, major amounts of leakage air. The pulsating two-phase current, which thus occurs in the socalled long milk hose, has to be separated into its two constituent parts milk and air in the milk flow meter and the kinetic energy of this milk flow has to be diminished. In the actual measuring chamber, the milk, which should be degassed to highest possible degree, must flow through the calibrated measuring opening exclusively in accordance with gravitation. It follows that the separated air must be caused to flow past the measuring path via an internal and/or external bypass, without having any opportunity of influencing the discharge behaviour of the milk to be measured.

Furthermore, the cyclic flow fluctation, which is especially caused by pulsation, has to be smoothed as effectively as possible before the milk flows through the actual measuring path of the milk flow meter. In order to eliminate strong surface roughness as well as for minimizing the formation of foam, it will be necessary to diminish turbulences to the best possible extent. Surface roughness and milk foam cause substantial measuring difficulties and impair the signal of the sensor.

For smoothing and degassing the flow of milk, a variety of different means are used often in combination, such as e.g. tangential inflow of the milk into an entrance dome, an entrance cyclone, a deflection shield construction, a prechamber supplying the measuring chamber, if desired, from below, an internal and/or external air bypass etc. The internal air bypass connects the measuring chamber and the discharge chamber and is arranged approximately on the highest level of the measuring chamber. In this case the air will directly sweep over the smoothed and degassed milk, which is to be measured, in the measuring chamber. The dimensions of the bypass must be large enough to provide identical pressure between the measuring chamber and the discharge chamber during the measuring process. An external bypass is used in cases in which the air, after having been separated e.g. in a cyclone, is removed from the cyclone separately and is then introduced in the discharge chamber or in the suction sump only at a point after the measuring path. In the case of this configuration, there is practically no flow of air in the measuring chamber, and this will have a positive effect on the measurement. However, the nature, the structural design and the dimensions of these means will influence not only the function of the milk flow meter but also, directly, the fluctuations and/or losses of the milking vacuum acting on the teat. The milking vacuum, however, must virtually not be influenced by the interconnection of e.g. a milk flow meter for reasons of milking technique and, especially, for reasons of udder health.

In the course of the milking operation, a milk flow profile characteristic of the respective cow is obtained, said milk flow profile varying approx. between 0.2 and, typically, 4 kg/min. Since, however—but this is rarely the case—a milk flow of up to 12 kg/min may be obtained, the flow rate capacity of modern milk flow meters must be adapted to this maximum value. A well-constructed milk flow meter will typically present the following sight: the milk lies comparatively quiet in the measuring chamber and accumulates normally up to a level which is still lower than half the height of the measuring chamber. On top of the milk there is foam of greater or lesser density, which will often extend up to the ceiling of the measuring chamber.

Especially in the case of smaller milk flow meters and in the case of milk fresh from the cow, the formation of such foam on top of the milk can practically never by avoided completely, nor is it possible to avoid milk spray. This means that, when the device is in operation, practically the whole measuring chamber is acted upon by milk components, and these components will then adhere to the measuring chamber and gradually thicken, whereby a hygienically intolerable film of protein and fat would form, if they were not reliably acted upon and removed after each milking operation by an adequate cleaning and disinfecting fluid.

For perfect daily cleaning and disinfection of a milking plant conforming to standard, a flow rate of approx. 2 l/min of rinsing liquid, in connection with a high, fluctuating percentage of air (approx. 40 to 150 l/min), is used in a circulation cleaning process. In view of the fact that the rinsing fluid, too, is smoothed in the interposed milk flow meter, said rinsing fluid will—just as, previously, the milk to be measured—lie in the measuring chamber comparatively quiet and without turbulences and, moreover, it will accumulate up to a level which is lower than one third of the maximum surface level. This means that the upper two thirds of the measuring chamber and the ceiling thereof will practically not be cleaned, and this is absolutely unacceptable for hygienic reasons. In addition, the upper portions of the measuring sensor will not be cleaned either, and, consequently, the use of the normal cleaning method is impossible for functional reasons as well.

Quite generally, it can be said that the better a milk flow meter works and the less its influence on the milking vacuum, the more difficult it is to clean. For carrying out measurements in a milk flow meter, milk and air should be separated as perfectly as possible and all turbulences should be diminished, whereas, for cleaning a milk flow meter, the strongest possible turbulences of a rinsing fluid intensively mixed with air are to be aimed at. An increase of the temperature and/or of the rinsing fluid concentration and/or of the cleaning period are intolerable for economical and/or ecological reasons. The mechanical component (wetting plus turbulence) is the most important factor in the cleaning process of milking machines, and this must also be achieved in the cleaning of a milk flow meter.

Various attempts to solve this problem have already been made. For example, it has already been attempted to simply flood the milk flow meter during the cleaning process by increasing the amount of rinsing liquid. The cleaning result which can be achieved in this way is, in principle, very good. Due to the fact that flooding (overflow) will, however, only take place when the rinsing medium flow rate is higher than the maximum capacity of the milk flow meter (12 l/min), this method necessitates that the flow rate is increased by at least the factor 6 in comparison with the cleaning process normally used for the milking plant. This, however, means that this cleaning process can, at best, be used as an emergency measure, since it stresses economy and ecology intolerably strong by an increased consumption of chemicals, energy and water. Moreover, it is, in practice, frequently impossible to achieve such high flow rates in cases in which the dimensions of other components of the milking plant represent bottle-necks.

An additional solution attempt is the socalled reverse rinsing, i.e. the exchange of the feed hose and of the discharge hose during the circulation cleaning process. This method will cause good turbulences within the whole milk flow meter and, consequently, a thoroughly satisfactory cleaning result. In this case, however, the problem arises that, at the end of the cleaning run, which is controlled by a timing means—since the milker will normally have gone home at this time—the milk flow meter will, due to the exchanged connections, always remain in a condition in which it is filled with rinsing liquid. This is absolutely intolerable for hygienic reasons and in many countries specializing in milk it is even forbidden by law. A vacuum-dependent, automatic drain valve could not successfully be used for final emptying in this case, since such a valve would also respond to short vacuum drops during the milking operation (dropping of the milking means, removal of the milking means) and would thus cause sporadic leakage of milk from the milk flow meter during the milking process. Moreover, at least in large agricultural enterprises, it is, from the point of view of working economy, not tolerable that the feed hose and the discharge hose have to be changed over four times a day in the case of each milk flow meter. In view of the comparatively large inside width (inside diameter 16 mm) as well as in view of the orientation of the hose connecting piece required from the point of view of milking technology, the construction of an adequate airtight two-way cock, which would have a large volume and which would also be difficult to handle, is complicated. Due to the film of grease formed, it would also be problematic to clean the interior of such a cock.

As an additional possibility, it has already been attempted to simply turn the whole milk flow meter upside down. In this case, too, the cleaning effect achieved within the whole interior is, in principle, very good. However, the problem arising in this connection is the same which also arises in the case of the above-mentioned reverse rinsing: the milk flow meter, which is positioned upside down, will not automatically discharge the rinsing liquid at the end of the cleaning cycle. Moreover, in practical everyday use, this type of cleaning can hardly be carried out for reasons of working economy and for ergonomic reasons, since, when the whole milk flow meter is turned upside down, the feed and discharge hoses coupled to the milking means will show a strong tendency to twist, to kink and to become entwined.

Devices for cleaning and disinfecting the milk-flow paths of pipeline milking plants are already generally known from German-pat. 26 08 585, German-Offenlegungsschrift 27 20 987 and German-Offenlegungsschrift 33 45 744.

German-Auslegeschrift 17 57 520 and German-pat. 32 08 197 also disclose devices for cleaning a milk sluice in a milking plant. In the case of such a milk sluice, the milk will normally flow during the milking process from the milk supply conduit via a pre-receptacle into the milk sluice from below. The milk sluice will normally be filled only up to a certain level before the milk will then be discharged from the sluice at normal pressure. Hence, for cleaning also the upper part of the milk sluice with a rinsing liquid, a branch conduit leading from the normal milk supply conduit to the upper end of the milk sluice is provided for the rinsing procedure, said branch conduit containing a valve which is adapted to be opened during said rinsing procedure. However, the use of such an additional conduit, which, during the rinsing procedure, serves to transport the rinsing liquid passed through the milk flow meter instead of the milk to the areas normally not filled with milk, proved to be impossible without a modification of the essential functions of the milk flow meter.

SUMMARY OF THE INVENTION

Hence, the present invention is based on the task of providing a milk flow meter of the type mentioned at the beginning, which also permits thorough and simple cleaning of the milk flow meter with the aid of a rinsing liquid passing therethrough without any negative influence on the normal mode of operation of the milk flow meter.

The present invention solves this task in the case of a milk flow meter of the type mentioned at the beginning by a rinsing conduit, one end of which leads into the discharge chamber and/or the measuring chamber essentially on the level of the upper end of said measuring chamber and the other end of which leads into the milk sump, and by an adjustment means which, in a rinsing position, connects the milk suction conduit essentially exclusively to the other end of the rinsing conduit.

The result of the above-mentioned solution is that, during the rinsing procedure, the main part of the rinsing liquid is drawn off via the upper portion of the measuring and discharge chambers and that only a small part is drawn off through the discharge chamber and the milk sump. This arrangement has the effect that, even in the case of a normal rinsing medium flow rate of approx. 1 to 3 l/min, the measuring and discharge chambers will be filled completely, i.e. up to the ceiling, with rinsing liquid. It follows that portions of the milk flow meter which are not cleaned in the course of the normal cleaning procedure will reliably be cleaned.

However, this complete filling of the measuring and discharge chambers produces still another effect: the rinsing liquid will now simultaneously block the (internal) air bypass. The large amount of air flowing through in the course of a conventional cleaning procedure (approx. 40 to 150 l/min of free air) is now forced to pass through the rinsing liquid, which has accumulated up to the ceiling, and this will cause strong bubbling within the chambers. In view of the fact that the rinsing liquid and the large amount of air are drawn off in common through the upper suction opening of the rinsing conduit, an extremely strong surface roughness combined with a strong shaking motion changing the liquid level will, moreover, be generated. The new structural design of the milk flow meter will, on the whole, achieve a hitherto unexpected, excellent mechanical cleaning effect in the course of the rinsing procedure.

It will be advantageous when the adjustment means comprises adjustment devices in the form of valves, which, in a rinsing position, connect the milk suction conduit essentially exclusively with the discharge chamber end communicating with the milk sump. The phrase "essentially exclusively" is intended to express that, in the rinsing position, at least most of the rinsing liquid, approx. between 60% and 90%, will flow through the rinsing conduit. However, as far as possible, a connection having a substantially smaller cross-section than the cross-section of the rinsing conduit should, also in the rinsing position, be maintained between the milk sump and the lower end of the discharge chamber on the one hand and the milk suction conduit on the other.

This will have the effect that, even in the course of the rinsing procedure, a small part of the rinsing liquid will be drawn off via the discharge chamber so that also the turbulences which are still caused in the discharge chamber and in the sump will suffice to reliable cause sufficient cleaning of these parts, and that, above all, the milk flow meter will also be emptied automatically of the whole amount of rinsing liquid at the end of the rinsing procedure by drawing the rinsing liquid out of the milk sump through these connections of small cross-section at the end of the rinsing procedure.

Such a connection between the lower end of the discharge chamber, i.e. the milk sump, and the suction conduit in the rinsing position can be constructed such that it is open also during the normal milking process, but it can also be constructed such that it will only be opened when e.g. the adjustment means is displaced to the rinsing position. In particular, such connection openings may also be provided in the valves themselves.

According to a special embodiment of the present invention, the discharge chamber, the milk sump and the suction conduit are arranged vertically one above the other, the rinsing conduit is constructed as a vertically adjustable tube which is open at its ends, and the tube is provided at the lower end thereof with a sealing collar which, in the lowered rinsing position of the tube, sealingly rests on a valve seat formed around the suction conduit. This structural design permits a particularly compact mode of construction.

In the case of this arrangement, the sealing collar can, for example, have provided therein passage means, which, in the rinsing position, connect the discharge chamber via the milk sump with the suction conduit.

According to an additional preferred embodiment of the present invention, the arrangement is of such a nature that the milk supply conduit communicates with the measuring chamber via a cyclone and an opening delimited by the lower end of a bulkhead, that the cyclone communicates with the milk sump via an additional air bypass, and that the end of the additional air bypass extending into the milk sump is positioned on a level which is lower than the level of the uppermost part of the lower end of the bulkhead by a distance corresponding to a predetermined vertical difference. When the vertical difference chosen is sufficiently large, this will have the effect that the additional air bypass can be regarded as being practically closed and that the rinsing liquid which has accumulated in front of the bulkhead is forced to pass below the bulkhead together with the air which has flown into the cyclone and which has been separated therein. This will have the effect that the air will virtually explode from the bottom to the top into the measuring and discharge chambers filled with the rinsing liquid. That, also in the case of this type of structural design, the air will actually essentially be prevented from flowing through the additional, external air bypass, can—as has already been stated—be achieved by choosing the above-mentioned vertical difference sufficiently large. If, for example, the lower end of the additional external air bypass is positioned approx. 5 cm lower than the lower end of the bulkhead, a pressure difference of approx. 5 cm water column will be obtained for the two competitive rinsing liquid transport paths. This pressure will quasi close the air bypass.

If, however, in exceptional cases, structural reasons make it impossible to easily obtain the necessary hydraulic pressure for closing the air bypass, the passage of the additional, external air bypass can, as an auxiliary solution, also be closed with the aid of simple mechanical means, e.g. by an additional closure cap or by a pneumatically actuable throttle means, which can also be closed completely. For this purpose, a simple, pneumatically actuable shut-off stocking or a simple diaphragm construction may be provided.

BRIEF DESCRIPTION OF THE DRAWINGS

In the following the present invention shall discussed on the basis of preferred embodiments shown in the drawing, in which:

FIG. 2 shows a longitudinal section, similar to that shown in FIG. 1, through an additional embodiment of the present invention;

FIG. 3 shows a section along the line III—III through the embodiment shown in FIG. 2;

FIG. 4 shows a fragmentary view of the embodiment shown in FIG. 2, which represents an additional modification of the embodiment shown in FIG. 2;

DETAILED DESCRIPTION

Figure 1:
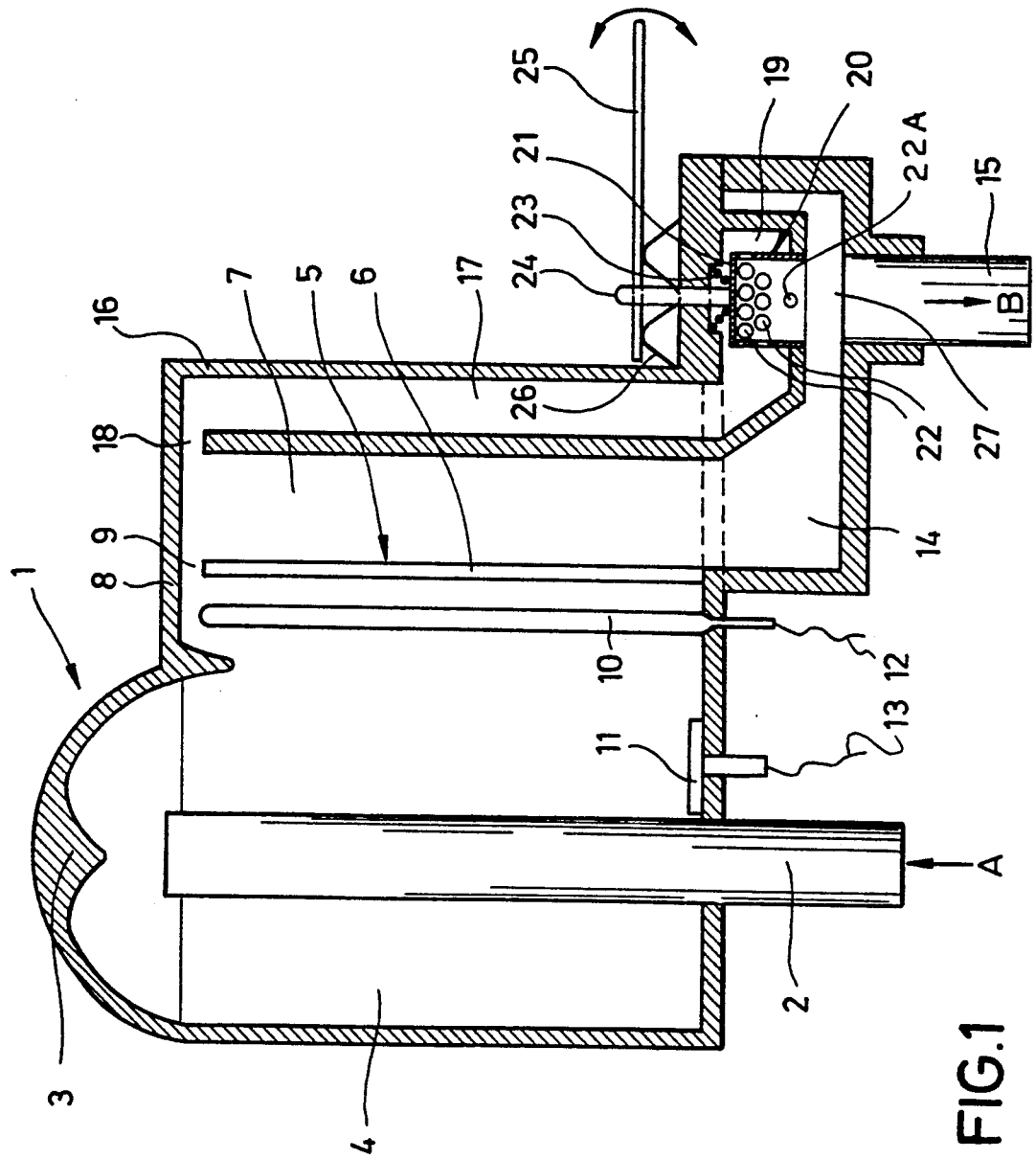
FIG. 1 shows a schematic longitudinal section through an embodiment of a milk flow meter constructed in accordance with the present invention.

In FIG. 1, the milk flow meter in general is identified by the reference numeral 1. The incoming milk is conveyed upwards through the milk supply conduit 2 in the direction of arrow A towards the dome 3 of a measuring chamber 4, and, when arriving at this dome, it is re-routed downwards into the measuring chamber 4. The measuring chamber 4 is separated from the milk discharge chamber 7 by a partition 5 having formed therein a calibrated slot 6 throughout its entire height. Between the upper end of the partition 5 and the lower surface of the ceiling 8, which defines the upper boundary of part of the measuring chamber as well as of the discharge chamber 7, an inner air bypass 9 is formed. In front of the slot 6, a bar-shaped electrode 10 is positioned upright within the measuring chamber, and a counterelectrode 11 is provided on the base of the measuring chamber. Both electrodes are connected to measuring devices, which are not shown, through electric leads 12, 13. The lower end of the discharge chamber, 7 is connected to a sump 14. The lowermost level of the sump communicates with a suction conduit 15 through which the milk is drawn off downwards in the direction of arrow B.

Within the milk flow housing 16, an additional rinsing conduit 17 is provided, which, at its upper end 18, leads into the discharge chamber 7 below the ceiling 8. In the lower end 19 of the rinsing conduit, a cylindrical valve is arranged such that its longitudinal axis is in alignment with the suction conduit 15 positioned below the valve. The cylindrical valve 20 is closed by a plate 21 at the top, whereas it is open at the bottom side thereof. Below the upper closure plate 21, openings 22 are formed on the circumference of the cylindrical valve. The valve is springloaded downwards towards a rinsing position by means of a spring 23. The upper plate 21 is connected via a holding pin 24 to an actuating lever 25 which extends transverse to the holding pin and which is fastened thereto, the actuating lever 25 abutting on a curved guide means 26. In the position shown, the actuating lever 25 abuts on the curved guide means 26 in such a way that the valve 20 is in its raised position, in which the lower end of the discharge chamber 7 directly communicates with the suction conduit 15 via the sump 14, the suction conduit 15 being, however, simultaneously connected to the rinsing conduit 17 through the openings 22 in the valve 20. When the actuating lever 25 is rotated by 90°, the valve will be moved to a lowered position on the basis of the force of the spring 23, and in the lowered position, the edge of the valve will sealingly engage the inlet opening 27 of the suction conduit 15 in the milk sump 14. In this position, the suction conduit 15 communicates with the rinsing conduit 17 essentially only through the openings 22 in the valve. At least one smaller opening 22A in the cylindrical circumferential surface of the valve 20 is, however, also provided on such a level that a connection between the sump 14 and the suction conduit 15 will be established through the opening in the lower rinsing position of the valve.

The function of the rinsing device is as follows: during normal use of the milk flow meter, the valve 20 is in the raised position shown in FIG. 1. In this position, the discharge chamber 7 is maximally connected to the suction conduit 15 via the milk sump 14. It is true that also the rinsing conduit 17 is connected to the suction conduit 15 via the valve 20 and the openings 22, but, during the milk metering operation, this will not have the effect that milk is transported away, but, at most, that a uniform pressure distribution will be obtained in the discharge chamber 7. The milk flow metering procedure, which is of secondary importance within the framework of the present invention, will then be carried out in such a way that the milk flows through the milk supply conduit 2 into the measuring chamber 4, from the measuring chamber 4 it flows through the slot 6 into the discharge chamber 7, and from the discharge chamber 7 it is transported away into the suction conduit 15 via the milk sump 14 through the milking vacuum prevailing in the suction conduit 15.

For cleaning the milk flow meter, an appropriate rinsing liquid with adequate introduction of air is passed through the milk flow meter instead of the milk in the same manner as in the case of the milk flow metering procedure. For this purpose, the valve 20 is, however, first moved to its lower position, whereby the connection between the discharge chamber 7, the milk sump 14 and the suction conduit 15 is interrupted to a large extent. Hence, the rinsing liquid can only be transported away into the suction conduit 15 via the upper end 18 of the rinsing conduit, the rinsing conduit 17 itself, the openings 22 in the valve 20. This will have the effect that the whole measuring chamber 4 fills with rinsing liquid. Due to the smaller opening (not shown) which is provided in the circumferential surface of the valve 20, also the whole sump 14 will, notwithstanding the above, be emptied of rinsing liquid through the opening at the end of the rinsing procedure by drawing the rinsing liquid off through the opening into the interior of the valve 20 and into the suction conduit 15.

For using the device as a milk flow meter, it will then suffice to raise the valve 20 again by rotating the actuating lever 25 by 90° and returning it to the position shown in FIG. 1.

FIG. 2 and 3 show an embodiment which is similar to that shown in FIG. 1, and, for this reason, identical parts are provided with identical reference numerals which have only been augmented by 100. These parts, which have already been described with respect to FIG. 1, will therefore not be explained again.

In FIG. 2, the milk is drawn off via a milk suction conduit 130 projecting with its end 129 into the milk sump 114. In the case of this embodiment, an adjustment means in the form of a rotary valve 131 is provided. The rotary valve 131 essentially consists of a cylindrical pot 132, which is open at the top and which has on its bottom side a holding pin 133 having attached thereto a knurled actuating screw 134, which is provided on the outside of the milk flow meter 101 and by means of which the cylindrical pot can be rotated about the vertically extending longitudinal axis of the holding pin 133.

As is shown best in FIG. 3, the cylindrical circumferential surface of the cylindrical pot has formed therein a larger window 135 and, in opposite relationship therewith, a smaller opening 136. The upper edge of the cylindrical pot 132 sealingly abuts, throughout is whole periphery, on the inner wall of a circular opening 137 defining the lower outlet boundary of the lower end 119 of the rinsing conduit 117.

As is shown best in FIG. 3, the outside of the circumferential surface of the cylindrical pot 132 sealingly abuts on the inner surface of the housing component 138, which delimits the milk sump 114, throughout an angle exceeding 180°.

In the position of the valve 131 shown in FIG. 2 and 3, the suction conduit 130 communicates via the upper free end of the cylindrical pot with the rinsing conduit 117 as well as via the window-shaped opening 135 in the valve 131 with the milk sump 114 and with the discharge chamber 107. When the knurled actuating screw 134 is rotated by 180° about the longitudinal axis of the valve, the window-shaped opening 135 will be moved to a position in which it sealingly abuts on the inner surface of the housing 138, whereas a connection between the inner side of the cylindrical pot and the milk sump 114 is only established by said opening 136. This last-mentioned position represents the rinsing position in which the suction conduit 130 essentially communicates with the rinsing conduit 117 alone, and in the case of which only the smaller opening 136 establishes a connection between the suction conduit 130 and the milk sump 114 and via the milk sump with the discharge chamber 107.

FIG. 4 only shows an additional possible modification of the embodiment shown in FIG. 2; in the case of the modification, the passage 118, which is provided in the embodiment according to FIG. 2, is closed and the rinsing conduit extends, at its upper end, through an opening 140 in the ceiling 108 into an outer conduit section 141 located above the ceiling. The conduit section 141 communicates with the measuring chamber and the discharge chamber via a second opening 142, which is provided in the ceiling 108 and which essentially leads into the internal air bypass 109. On the inner side of the conduit section 141, the opening 142 is normally closed by a ball 143 of a check valve 143A so that, during the normal milk flow metering operation, the foam will be prevented from being discharged through the opening 142 past the measuring gap 106. However, the ball 143 of the check valve is preferably not spring-loaded by means of a spring, but only constructed as a 45°-seat valve in the case of which the closing force is created by the weight of the ball 143 alone. The closing force should just be strong enough for counteracting the weak driving forces of the foam. The ball used may, for example, be a glass ball. If the force holding the ball in the closed position were greater, the rinsing liquid flow rate would tend to decrease and the cleaning efficiency would deteriorate.

Figure 5:
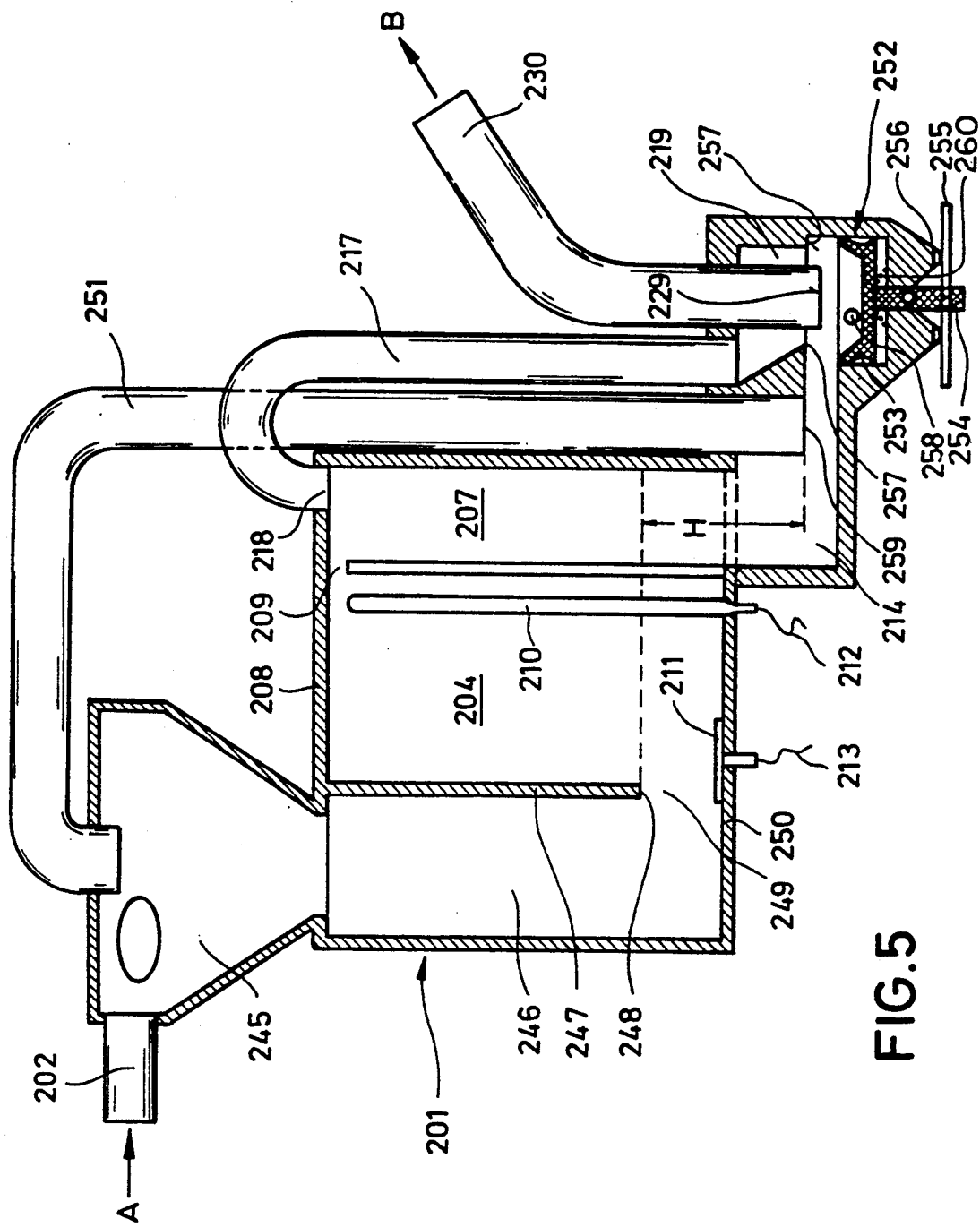
FIG. 5 shows a schematic longitudinal section through an additional embodiment according to the present invention.

FIG. 5 shows a milk flow meter which is similar to that shown in the preceding figures, and, consequently, identical parts are provided with identical reference numerals which have, however, been augmented by 200. The milk supply conduit 202 leads tangentially into a cyclone 245 whose lower end is connected to a pre-chamber 246 positioned below the cyclone. The pre-chamber 246 is separated from the measuring chamber 204 by a bulkhead 247, an opening 249 through which the milk can flow from the pre-chamber into the measuring chamber 204 being, however, left open between the lower end 248 of the bulkhead 247 and the base 250. Between the upper end of the cyclone 245 and the milk sump 214, an outer air bypass is defined by the conduit 251. Furthermore, the rinsing conduit 217 is constructed as a tube in the case of this embodiment, the upper end 218 of the tube leading, from above, into the ceiling 208 above the discharge chamber 207.

Furthermore, an adjustment means in the form of a disk valve 252 is provided. The disk valve 252 is provided with a disk-shaped sealing component 253, which is open at the top and which is supported on a holding pin 254, the holding pin having secured thereto an actuating lever 255. The actuating lever abuts on a curved guiding means 256. The disk-shaped valve itself is spring-loaded by means of a spring 258 in its longitudinal direction upwards towards an annular valve seat 257. A passage 258 is formed in the annular sealing lip of the disk-shaped sealing component 253.

The end 259 of the outer air bypass 251, which extends into the milk sump 214, is positioned on a level which is lower than the level of the lower edge 248 of the bulkhead 247 by a distance corresponding to the vertical difference H.

During the normal milk flow metering operation, the valve 252 occupies the position, which is shown in FIG. 5 and in which the lower end 229 of the suction conduit 230 communicates with the sump 214 as well as with the lower end 219 of the rinsing conduit 217. For the rinsing procedure, the valve 252 can be moved to a rinsing position by rotating the actuating lever 255 by 90° about the longitudinal axis of the valve, whereby the valve will be raised, due to spring 260, to a position in which the upper sealing edge sealingly abuts on the valve seat 257. In this position, the lower end 229 of the suction conduit 230 essentially communicates with the rinsing conduit 217 via the opening 258 in the disk-shaped valve alone. Only via the passage 258 in the sealing lip of the valve, the suction conduit 230 is also connected to the milk sump 214. In view of the fact that the lower end 259 of the external air bypass 251 is positioned on a level which is lower than the level of the lower edge 248 of the bulkhead 247 by a distance corresponding to the vertical distance H, there will be a pressure difference between these two levels of such a nature that the whole rinsing liquid plus the air entrained thereby will flow through the pre-chamber, then pass below the bulkhead and enter the measuring chamber 204, where the air will explosively move from the bottom to the top towards the ceiling 208, whereby a thorough cleaning effect will be produced. The effect that the outer air bypass 251 will be pressure-closed due to the vertical difference H can even be intensified by choosing an adequate relationship between the cross-section of the air bypass 251 and the cross-section of the rinsing conduit 217, i.e. by selecting the cross-section of the rinsing conduit 217 such that it exceeds the cross-section of the bypass conduit 251 by an adequate value. However, in order to avoid a vacuum drop through the bypass conduit 251 during the normal milk flow metering operation, it is not possible to choose an arbitrarily small cross-section of said bypass conduit 251.

Figure 6:
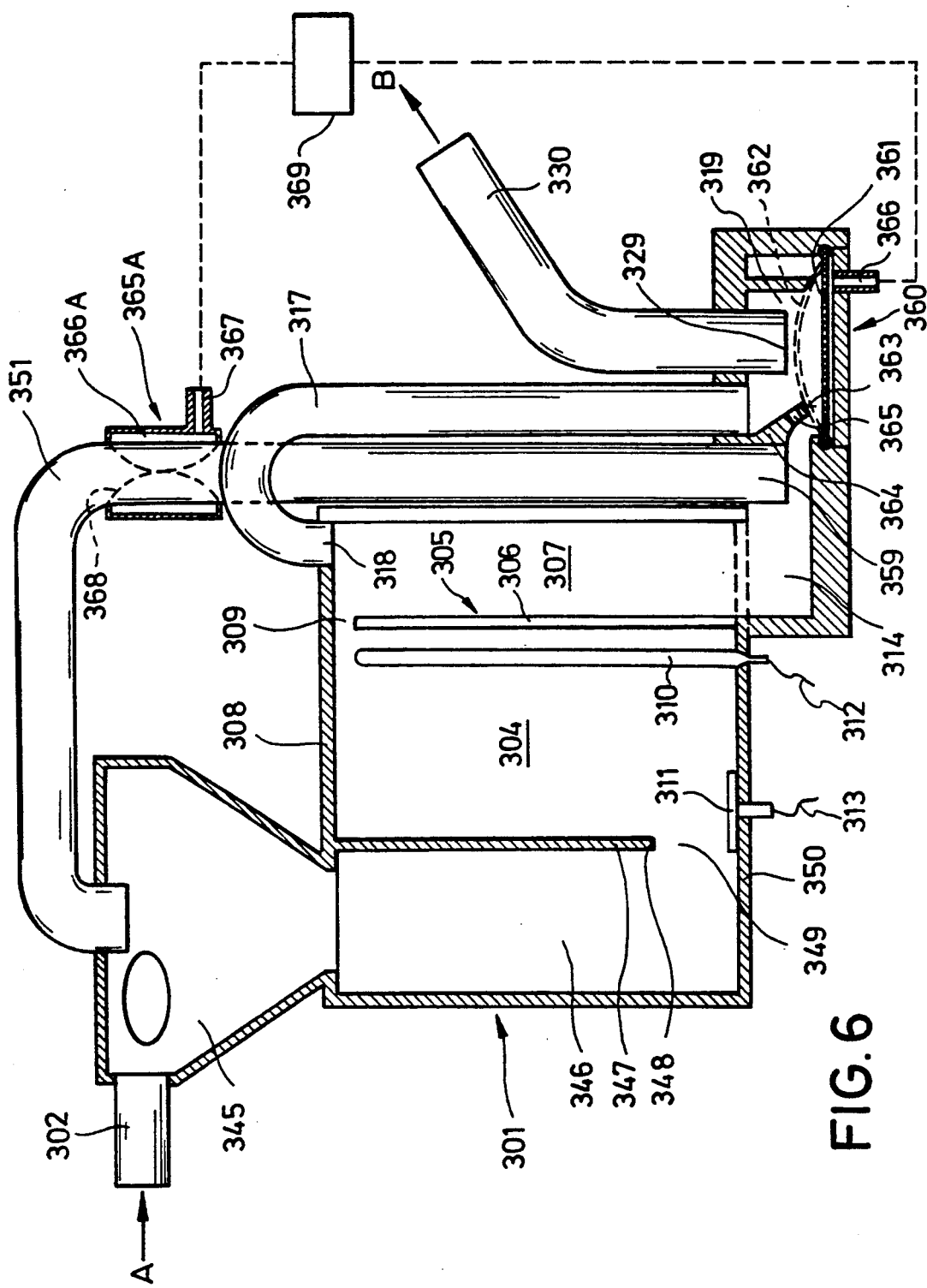
FIG. 6 shows a schematic longitudinal section through an additional embodiment which is similar to the embodiment shown in FIG. 5.

FIG. 6 shows an embodiment of the milk flow meter which is similar to that shown in FIG. 5, and, consequently, identical parts are provided with identical reference numerals, which have, however, been augmented by 300, the identical parts being therefore not discussed in detail again. In the case of this embodiment, a diaphragm valve 360, which is shown in its relaxed, non-actuated position in FIG. 6, is provided as an adjustment means; in this position, the suction conduit 330 essentially communicates with the milk sump 314 and, consequently, with the discharge chamber 307, but simultaneously also with the lower end 319 of the rinsing conduit 317. When the diaphragm valve 360 has pressure applied thereto via a conduit 366 so the diaphragm 361 will assume the position which is shown in FIG. 6 by broken lines as at 362 and which corresponds to the rinsing position, the diaphragm will sealingly abut on an annular valve seat 363 defined by the lower end 319 of the rinsing conduit 317. In this position, the diaphragm will, however, still leave open the lower end 329 of the suction conduit 330. It follows that, in this position of the diaphragm, the essential connection between the suction conduit 330 and the milk sump 314 and, consequently, the discharge chamber 307 is blocked. A connection between the suction conduit 330 and the milk sump 311 is only established by a passage opening 365, which is provided in the wall 364 defining the valve seat 363.

Furthermore, an adjustable throttle means 365A is, only preferably, provided in the external air bypass conduit 351 in the case of this embodiment; the throttle means consists of a cylindrical housing having inserted therein an elastic, cylindrical diaphragm (stocking-type hose), which is fixed in position. With the aid of this throttle means, it is possible to narrow the cross-section of the external air bypass conduit 351 by applying via the conduit 367 an overpressure to the space between the housing 365A and the cylindrical diaphragm 366A, whereby the diaphragm 366A will move approximately to the position shown by the broken lines 368 in this figure. It follows that, by means of an adequate overpressure on conduit 367, it will also be possible to close the whole conduit 351 so that the throttle means virtually serves as a shut-off valve. Such a throttle means 365A is only used in case of need. In view of the fact that the throttle means 365A as well as the diaphragm valve 360 are both adapted to be pneumatically activated, a common control means 369 can be provided with the aid of which the throttle means and the diaphragm valve are simultaneously controlled so as to obtain a rinsing position in such a way that pressure is applied to both devices so that each of the devices will assume its position shown by broken lines in FIG. 6. For the normal mode of operation of the milk flow meter, both devices will again be returned to their position of rest with the aid of the vacuum control circuit 369.

Figure 7:
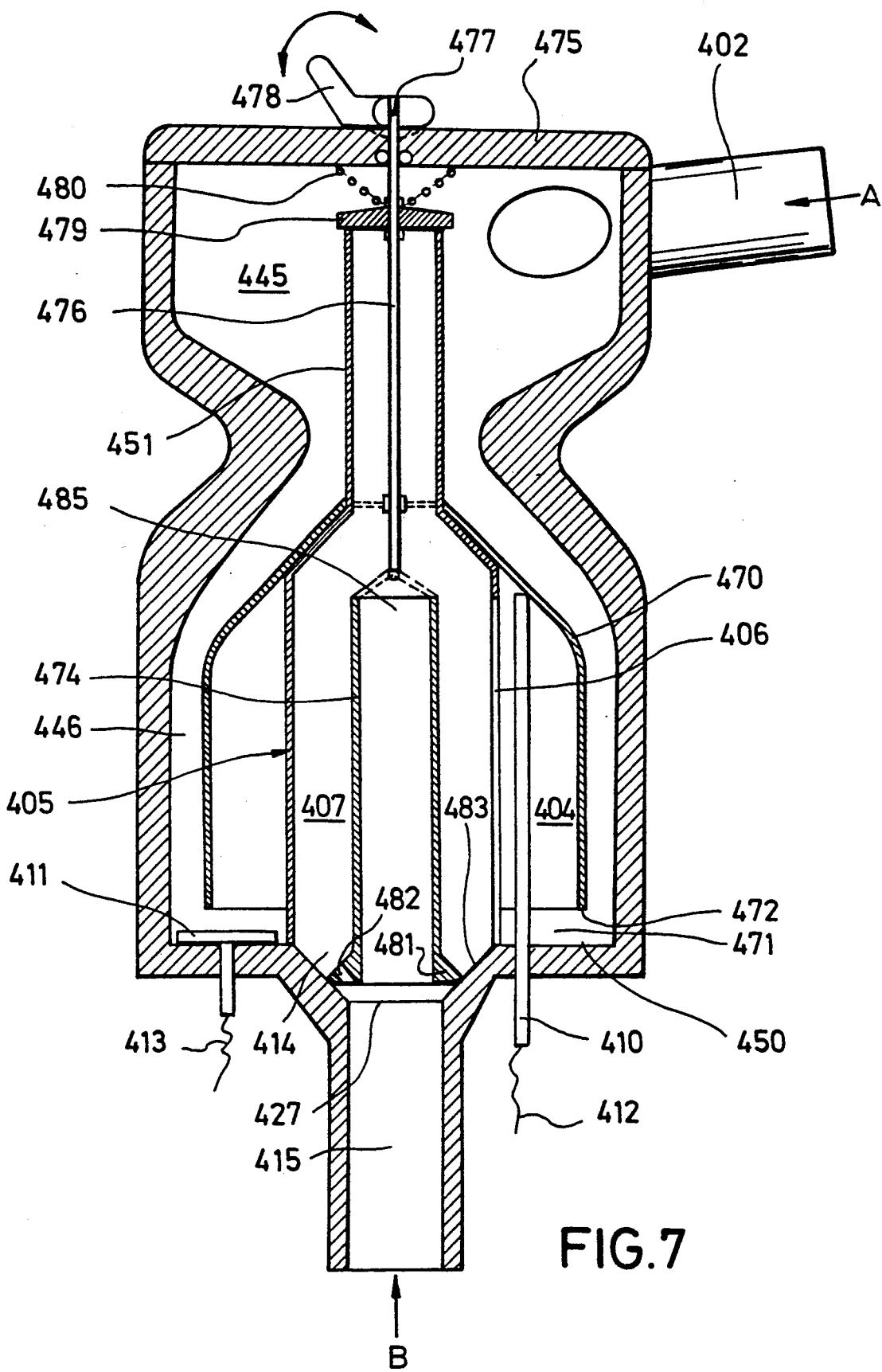
FIG. 7 shows a longitudinal section through an additional embodiment according to the present invention.

FIG. 7 shows an additional embodiment of a milk flow meter, which is similar to the embodiment shown in FIG. 5 and 6, and, consequently, corresponding components are provided with corresponding reference numerals, which have, however, been augmented by 400.

In the case of this embodiment, the cyclone 445 is rotationally symmetrical with respect to the pre-chamber 446 and a diving bell 470, which defines the partition means and below which the measuring chamber 404 is provided. The prechamber 446 communicates with the measuring chamber via an opening 471 between the lower edge 472 of the diving bell and the base 450 of the milk flow meter. The measuring chamber 404 itself has an annular configuration and surrounds a cylindrical partition 405, which has formed therein a calibrated measuring slot 406. The cylindrical partition 405 surrounds a discharge chamber 407, which merges at its lower end with the milk sump 414 defined by a downwardly tapering conical section of the discharge chamber 407. The milk sump 414 merges at its lower end directly with the suction conduit 415.

The upper end of the cylindrical partition 405 tapers conically upwards and merges with a cylindrical conduit 451, which has its longitudinal axis arranged centrically with respect to the whole device and which defines an air bypass communicating directly with the discharge chamber 407.

The discharge chamber 407 has arranged therein a tube section, which defines the rinsing conduit 474 and which is aligned along the central longitudinal axis of the device, the tube section being adapted to be vertically adjusted along this axis. The upper end of the tube 474 is fastened to rod means 476 guided in the bypass conduit 451 and in the upper cover lid 475 of the whole milk flow meter housing. The rod means 476 can be raised and lowered, respectively, with the aid of a rocking lever 478, which is articulated on the upper end of the rod means at point 477, by pivoting the rocking lever about its articulation axis. The rod means 476 have additionally secured thereto a covering cap 479, which, in the rinsing position shown in FIG. 7, closes the upper end of the tube 451 of the bypass conduit. By means of the spring 480, the rod means 476 are spring-loaded downwards towards the position shown in FIG. 7, and they can be raised from this position by pivoting the lever 478.

The lower end of the tube 474, which defines the rinsing conduit, is surrounded by a sealing collar 481. This sealing collar has formed therein a passage opening 482, which, in the position of the tube 474 shown in FIG. 7, interconnects the discharge chamber 407 and the suction conduit 415. In the position of the tube 474 shown in FIG. 7, the sealing collar 481 will, in addition, sealingly abut on a valve seat 483 defined by the conical wall of the milk sump 414.

The upper end 485 of the tube 474, which defines the rinsing conduit, is positioned approximately on one level with the upper end of the slot 406. The upper end may also extend a bit farther towards the lower end of the tube 451 defining the air bypass, but, in the rinsing position shown in FIG. 7, it should end on a level which is not essentially lower than the level of the upper end of the slot 406.

The mode of operation of the cleaning device is as follows: in the rinsing position shown in FIG. 7, the rinsing liquid will flow through the supply conduit 402, the interior of the cyclone 445, the pre-chamber 446, the annular opening 471 into the the measuring chamber 404, and from the measuring chamber it will enter the discharge chamber 407 via the measuring slot 406. In view of the fact that the discharge chamber 407 is a virtually closed chamber due to the sealing collar 481 abutting on the valve seat 483, the rinsing liquid will not be able to flow into the tube 474, which defines the rinsing conduit, until the level of liquid in the discharge chamber 407 has risen up to the upper end 485 of the tube 474. Since the upper end of the air bypass 451 is, moreover, closed by the covering cap 479, it is not possible that any air flows directly into the discharge chamber 407 via this air bypass. On the contrary, the air has to flow through the measuring chamber together with the rinsing liquid. Notwithstanding this, the discharge chamber 407 will completely be emptied of rinsing liquid at the end of the rinsing procedure due to the passage opening 482 provided in the sealing collar 481.

For normal operation of the milk flow meter, the rocking lever 478 is pivoted about its articulation point 477 on the rod means 476, whereby the rod means will be raised against the force of the spring 480. This will have the effect that the covering cap 479 is raised from the upper end of the tube 451, which defines the air bypass, and that the tube 474 is raised simultaneously. The sealing collar 481 will thus be raised from the valve seat 483 so that the discharge chamber 407 will then directly communicate with the suction conduit 415 via the milk sump 414. In this position, the milk flow meter can carry out its function without being impaired in any way.

The embodiments of the invention in which an exclusive property or privilege is claimed are defined as follows:

1. A milk flow meter comprising a measuring chamber connected to a milk supply conduit, a discharge chamber having means therein defining a milk sump at a lower end thereof, calibrated passageway means for providing a fluid connection between said measuring chamber and said discharge chamber, a milk suction conduit connected to said milk sump, means defining a rinsing conduit connected in fluid circuit with and extending between at least one of said measuring chamber and said discharge chamber at a first end thereof and said milk sump at a second end thereof, said first end being oriented adjacent an upper end of said measuring chamber and said discharge chamber, respectively, and an adjustment means selectively controllable between a first condition and a fluid restricting second condition for controlling a flow of a rinsing liquid between said at least one measuring chamber and said discharge chamber and said milk sump, said first condition providing a nearly unobstructed fluid path between said at least one of said measuring chamber and said discharge chamber and said milk sump, said second condition providing a restricted flow between said at least one of said measuring chamber and said discharge chamber and said milk sump and a nearly unobstructed path between said rinsing conduit and said milk sump.

2. The milk flow meter according to claim 1, wherein the adjustment means comprises an expandable and contractible diaphragm valve which, in an expanded condition thereof, interrupts the connection between the lower end of the discharge chamber and the milk suction conduit to place said adjustment means in the second condition.

3. The milk flow meter according to claim 1, wherein the adjustment means comprises an adjustable valve cap selectively controllable between first and second positions, said adjustable valve cap, in said second position, interrupting the connection between the lower end of the discharge chamber and the milk suction conduit to place said adjustment means in the second condition.

4. The milk flow meter according to claim 1, wherein the adjustment means comprises a rotary valve selectively controllable between first and second positions, said rotary valve, in the first position, providing a connection between the milk suction conduit and the lower end of the discharge chamber and the second end of the rinsing conduit on the other, and, in the second position, interrupting the connection between the milk suction conduit and the lower end of the discharge chamber to place said adjustment means in the second condition.

5. The milk flow meter according to claim 1, wherein between the lower end of the discharge chamber and the suction conduit a partition is provided which extends into the milk sump and includes an opening therethrough to provide the restricted flow between the lower end of the discharge chamber and the suction conduit when the adjustment means is in the second condition.

6. The milk flow meter according to claim 1, wherein said first end of the rinsing conduit terminates, at least partially, in the upper side of the measuring chamber.

7. The milk flow meter according to claim 6, wherein at least the part of the rinsing conduit terminating in the upper side of the measuring chamber includes a check valve for closing the first end of the rinsing conduit.

8. The milk flow meter according to claim 1, wherein the discharge chamber, the milk sump and the suction conduit are arranged vertically one above the other, wherein the rinsing conduit is a vertically adjustable tube which is open at its ends, and wherein said tube has at the lower end thereof a sealing collar which, in the lowered second position of said tube, sealingly rests on a valve seat formed around the suction conduit.

9. The milk flow meter according to claim 8, wherein the sealing collar has formed therein at least one passage which, in the second position, connects the discharge chamber via the milk sump with the suction conduit.

10. The milk flow meter according to claim 1, wherein the milk supply conduit communicates with the measuring chamber via a cyclone and an opening delimited by a lower end of a bulkhead, wherein the cyclone communicates with the milk sump via an additional air bypass, and wherein an end of the additional air bypass extending into the milk sump is positioned on a level which is lower than a level of an uppermost part of the lower end of the bulkhead by a distance corresponding to a predetermined vertical difference.

11. The milk flow meter according to claim 10, wherein the additional air bypass has provided therein an adjustable throttle means.

12. The milk flow meter according to claim 11, wherein the adjustable throttle means is defined by a pneumatically adjustable, elastic diaphragm stocking for altering the cross-section of the air bypass.

13. The milk flow meter according to claim 10, wherein the cross-section of the rinsing conduit is substantially larger than that of the additional air bypass.

14. The milk flow meter according to claim 10, wherein the additional air bypass communicates with the milk sump and the suction conduit via the discharge chamber.

15. The milk flow meter according to claim 14, wherein the adjustment means comprises an adjustable cover by means of which the end of the additional air bypass leading into the cyclone is closed in the second position of the adjustment means.

16. The milk flow meter according to claim 3, wherein the valve cap has provided therein at least one opening through which the suction conduit communicates with the milk sump and with the lower end of the discharge chamber in the second condition thereof.

17. The milk flow meter according to claim 4, wherein the rotary valve has provided therein at least one opening through which the suction conduit communicates with the milk sump and with the lower end of the discharge chamber in the second condition thereof.

* * * * *

UNITED STATES PATENT AND TRADEMARK OFFICE
CERTIFICATE OF CORRECTION

PATENT NO. : 5,313,833
DATED : May 24, 1994
INVENTOR(S) : Tilman Hoefelmayr

It is certified that error appears in the above-indentified patent and that said Letters Patent is hereby corrected as shown below:

On the title page, item [75] change the country "Fed. Rep. of Germany" to ---Switzerland---.

In the abstract, line 13; change "means" to ---device---.
line 19; change "means" to ---device---.

Column 7, line 30; change "lowered" to ---lower---.
line 31; change "lowered" to ---lower---.

Column 8, line 39; change "is" to ---its---.

Column 9, line 50; change "258" to ---260---.

Column 10, line 3; delete "258".
line 66; delete "365A".

Column 13, line 3; after "discharge chamber" insert ---,---.
line 4; delete "and".
line 4; after "sump" insert ---and said milk suction conduit--- .

UNITED STATES PATENT AND TRADEMARK OFFICE
CERTIFICATE OF CORRECTION

PATENT NO. : 5 313 833
DATED : May 24, 1994
INVENTOR(S) : Tilman Hoefelmayr

It is certified that error appears in the above-indentified patent and that said Letters Patent is hereby corrected as shown below:

Column 13, line 7; after "sump" insert
---and said milk suction conduit---.

line 8; after "sump" insert
---and said milk suction conduit--- .

line 29; delete "on the other".

line 31; delete "to".

line 32; delete "place said adjustment means in the second condition".

Signed and Sealed this

Twentieth Day of December, 1994

Attest:

BRUCE LEHMAN

Attesting Officer        Commissioner of Patents and Trademarks